(12) United States Patent
Nakamura et al.

(10) Patent No.: US 9,167,193 B2
(45) Date of Patent: Oct. 20, 2015

(54) IMAGE DISPLAY DEVICE

(75) Inventors: Yoshitomo Nakamura, Tokyo (JP); Masaki Yamakawa, Tokyo (JP); Emiko Kido, Tokyo (JP); Satoru Kubota, Musashino (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 2638 days.

(21) Appl. No.: 11/783,063

(22) Filed: Apr. 5, 2007

(65) Prior Publication Data

US 2007/0285569 A1  Dec. 13, 2007

(30) Foreign Application Priority Data

Apr. 7, 2006  (JP) ................................. 2006-105918

(51) Int. Cl.
| | |
|---|---|
| *H04N 5/58* | (2006.01) |
| *H04N 21/422* | (2011.01) |
| *H04N 21/4223* | (2011.01) |
| *H04N 21/431* | (2011.01) |
| *H04N 21/44* | (2011.01) |
| *H04N 21/442* | (2011.01) |

(52) U.S. Cl.
CPC .............. *H04N 5/58* (2013.01); *H04N 21/4223* (2013.01); *H04N 21/42202* (2013.01); *H04N 21/4318* (2013.01); *H04N 21/44008* (2013.01); *H04N 21/44218* (2013.01)

(58) Field of Classification Search
CPC ............. H04N 5/20; H04N 5/44; H04N 5/57; H04N 5/58; H04N 9/73; H04N 9/77
USPC .......... 345/690, 8; 348/564, 799, 220.1, 706; 725/10–21; 434/322, 323, 350, 351, 434/352, 365
See application file for complete search history.

(56) References Cited

U.S. PATENT DOCUMENTS

| | | | |
|---|---|---|---|
| 7,019,762 B2 * | 3/2006 | Yoshihara et al. ............ 345/690 |
| 2006/0119539 A1 * | 6/2006 | Kato et al. ......................... 345/8 |
| 2006/0221260 A1 * | 10/2006 | Fujine et al. ................... 348/790 |
| 2007/0126884 A1 * | 6/2007 | Xu et al. ..................... 348/220.1 |

FOREIGN PATENT DOCUMENTS

| | | |
|---|---|---|
| JP | 2002-323690 A | 11/2002 |
| JP | 06-308891 A | 11/2004 |

* cited by examiner

*Primary Examiner* — Olga Merkoulova
(74) *Attorney, Agent, or Firm* — Birch, Stewart, Kolasch & Birch, LLP

(57) ABSTRACT

A display device is provided that controls, considering affection due to a watcher's age and his viewing distance as human-visual characteristics, a display-screen brightness level at which the watcher does not feel glare. The display-screen brightness is most suitably set by simple calculation using relationships among watcher's ages, display sizes, glare levels, and screen-illuminance levels, etc. obtained by a subjective-assessment experiment. According to this display device, considering watcher's various conditions such as the age, the visual acuity, and the viewing distance, even if the watcher watches the display for a relatively long time, the watcher does not feel tiredness; thus, comfortable watching can be achieved.

17 Claims, 4 Drawing Sheets

IMAGE DISPLAY DEVICE

BACKGROUND OF THE INVENTION

1. Field of the Invention

The present invention relates to image display devices.

2. Description of the Prior Art

Recently, in television sets used in general homes, a flat-panel display such as a liquid-crystal display device or a plasma display device has become popular instead of a Braun-tube display. The technology of a high-luminance flat-panel display has progressed with the improvement of device performance. However, although the technology of a high-luminance display device improves the visibility thereof, the technology has also led an important cause of tiredness or eye-fatigue due to glare feeling.

Moreover, a problem has also occurred that the cost of electric-power consumption increases with the high luminance of the liquid-crystal display device or the plasma display device.

Accordingly, a method is generally used in which, by installing into a display device a light receiving element for measuring the brightness level of the environment thereof, the display luminance of its screen is controlled with the environmental brightness. When the environment is relatively dark, the display luminance is set lower, while when the environment is relatively light, the display luminance is set higher. Thus, the visibility can be secured in the light environment, the glare feeling can be prevented, and the electric-power consumption can also be reduced.

For example, in a conventional display device, based on the peripheral light of the display screen, the screen luminance is automatically controlled to a brightness level at which an observer can comfortably see the screen. Specifically, the light receiving element is placed, towards the observer, close to the display screen. The brightness level dose to the display screen is measured by this light receiving element. The range of the display-screen luminance is calculated based on this measurement result, and the brightness level of the display device is controlled. The luminance of the display screen is calculated from the brightness level dose to the display screen and a constant number (Japanese Laid-Open Patent Publication No. 1994-308891).

Moreover, in another conventional display device, the brightness is adjusted to personal preference. In this control method, any one of plural functions is selected, which have been preset to calculate the luminance where the environmental illuminance is set as a parameter. The luminance corresponding to the environmental illuminance is obtained based on the selected function. Back light is lightened with the obtained luminance. The environmental brightness is measured using a brightness sensor similarly to the method disclosed in Patent Document 1, and by selecting a predetermined luminance-control setting value, comfortable environment that is matched to the personal preference is set (Japanese Laid-Open Patent Publication No. 2002-323690).

SUMMARY OF THE INVENTION

However, the human eye is affected by all light rays in the field of view. Therefore, the glare feeling that a watcher feels is caused not only by light from the image display device, but also by that from the background region of the device. Moreover, the visual acuity, the age, and the viewing distance, etc. of the watcher are also considered to be related. Therefore, the conventional method, in which only the environmental brightness level is measured, and the brightness level of the display device is controlled, can neither necessarily nor sufficiently reflect the watcher's preference.

An objective of the present invention, which is made to solve the above described problem, is to provide an image display device in which the brightness of a display screen is controlled so as to be suited to the characteristics of the environmental brightness and a watcher by calculating the screen luminance level using parameters such as information corresponding to the visual acuity and the age of the watcher, the size of the image display device, the viewing distance, and the illuminance on the face of the display.

An image display device according to the present invention includes a display screen, a screen-illuminance measurement unit for measuring the illuminance level close to the display screen, a setting unit for setting watcher information, a screen-luminance controller for determining the maximum luminance level of the display screen, and a calculator for creating information for determining the maximum luminance level based on the illuminance level dose to the display screen and the watcher's information.

According to the present invention, an image can be displayed with appropriate brightness corresponding to various environmental brightness levels and the age group of watchers. Also, in a case in which the watcher watches the screen for a relatively long time, the tiredness of the watcher can be reduced. Moreover, by controlling the brightness of the screen, the reduction of the electric-power consumption can also be achieved.

DESCRIPTION OF THE PREFERRED EMBODIMENTS

Embodiment 1

Figure 1:
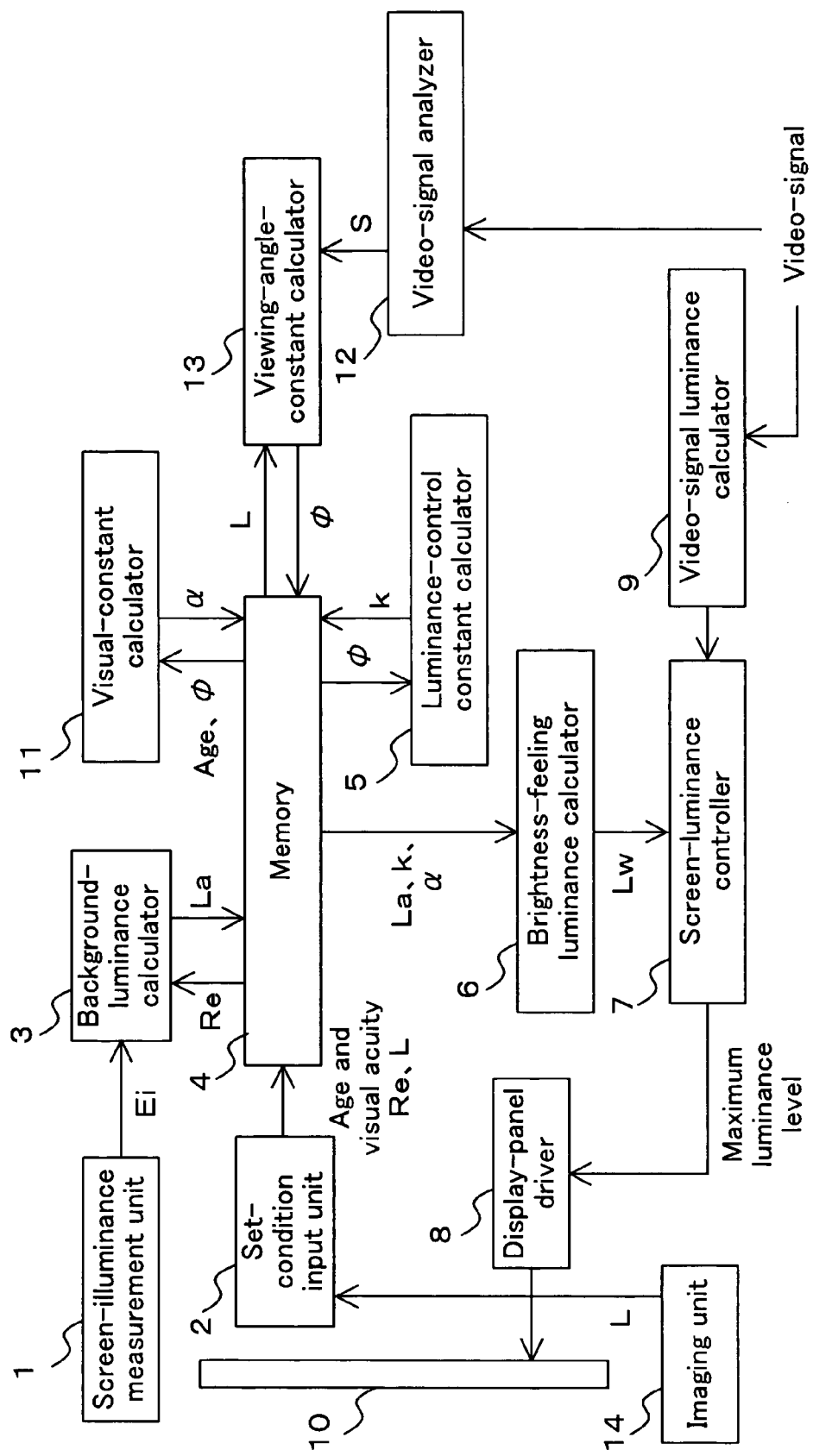
FIG. 1 is a block diagram illustrating an image display device according to Embodiment 1 of the present invention.

FIG. 1 is a block diagram representing a configuration of an image display device according to Embodiment 1 of the present invention. The image display device according to Embodiment 1 includes a screen-illuminance measurement unit 1, a set-condition input unit 2, a background-luminance calculator 3, a memory 4, a luminance-control constant calculator 5, a brightness-feeling luminance calculator 6, a screen-luminance controller 7, a display-panel driver 8, a video-signal luminance calculator 9, a display screen 10, a visual-constant calculator 11, a video-signal analyzer 12, a viewing-angle-constant calculator 13, and an imaging unit 14. Here, hereinafter, the background-luminance calculator 3, the luminance-control constant calculator 5, the brightness-feeling luminance calculator 6, the visual-constant calculator 11, and the viewing-angle-constant calculator 13 may also be collectively called as a calculator.

The screen-illuminance measurement unit 1 is a light receiving element placed, towards a watcher, close to the display screen 10. The light receiving element is, for example, configured of a silicon photodiode whose visual sensitivity is compensated and an amplifier. The set-condition input unit 2 includes a remote-controller light-receiving unit. The set-condition input unit 2 can receive various conditions by a watcher's operation using a remote controller which is not illustrated in the figure. The imaging unit 14 includes an image sensor and an image processing unit. The imaging unit 14 takes a watcher's image. The imaging unit 14 can obtain, based on the image, not only the distance between the watcher and the display screen 10 (the viewing distance) but the watcher's age by image processing.

Figure 2:
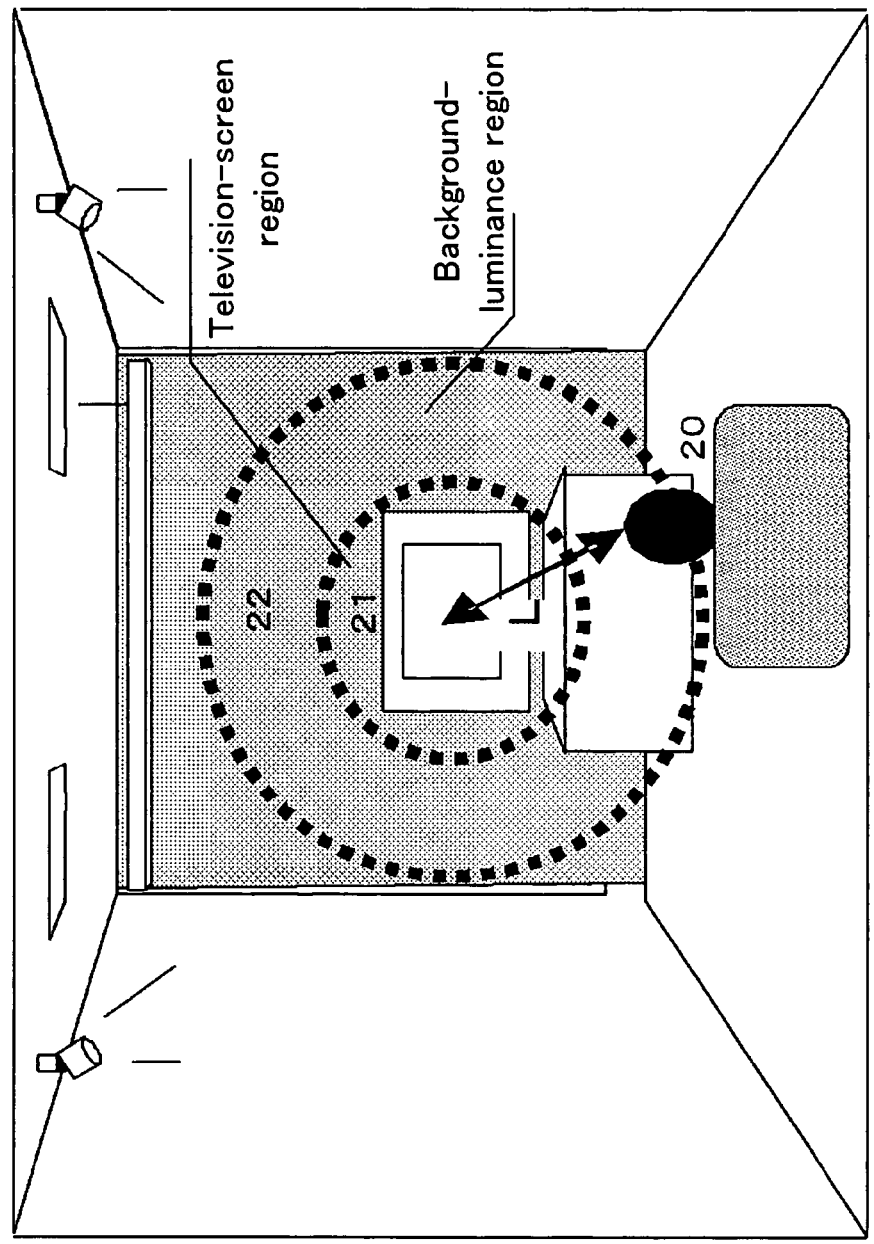
FIG. 2 is a view illustrating a subjective-assessment experiment with respect to a background luminance level and a display-screen luminance level at which a watcher begins to feel glare.

On the other hand, the human eye is affected by all light conditions from his visual field. As represented in FIG. 2, the visual field of a watcher 20 can be separated into two regions. One region is affected by the display screen 10 of the image display device (a television-screen region 21). The other region is affected by the environment (a background luminance region 22). Here, the glare-feeling level is assumed to be affected by the area ratio between the brightness level of the television-screen region and the brightness level of the background luminance region inside the visual field. The glare-feeling level relates to the brightness level and the display area of the display device, the brightness level of the background, and the visual acuity and the viewing distance of the watcher 20, etc. Therefore, even if a simple method is carried out in which the brightness of the display device is controlled only by measuring the environmental brightness level, it is not necessary to reflect the watcher's preference. In order to most suitably control the brightness of the display screen automatically, it is necessary to reflect the size and the brightness of the display device, the viewing distance between the display device and the watcher, and the visual acuity and the age of the watcher.

A result of a preliminary experiment that has been previously performed to clear the above objective is explained in detail.

A relationship was obtained between a screen illuminance Ei and a background luminance La when the brightness of a room where an image display device is placed is varied by lighting, etc. Here, the screen illuminance Ei is an illuminance measured dose to the center of the display screen when the display screen 10 is switched off. When the screen illuminance Ei is measured, illuminometer is set towards the watcher. On the other hand, the background luminance is an average luminance obtained by image processing based on a fisheye image with a sight of 180 degrees from an arbitrary point at which the watcher is assumed to stand towards the display screen. The display device is placed at the center of the sight. However, when the background luminance was calculated, the luminance of this display device itself was excluded from the calculation. That is, the background luminance is the average luminance of only the background of the display device. As a result, it was found that the screen illuminance Ei and the background luminance La can be favorably approximated by a linear relational expression. That is, the background luminance can be expressed by:

$$La = Re \times Ei \qquad (1)$$

where Re is a constant determined by the reflectivity of the room-wall, the room shape, or the relative position between the image display device and the watcher, etc. In the display device according to the present invention, Re can be set to a suitable value. The background-luminance calculator 3 calculates the background luminance La from the screen illuminance Ei based on Equation (1).

The background luminance La calculated is recorded in the memory 4. The background luminance La having been recorded is transmitted to the brightness-feeling luminance calculator 6 as a parameter.

Figure 3:
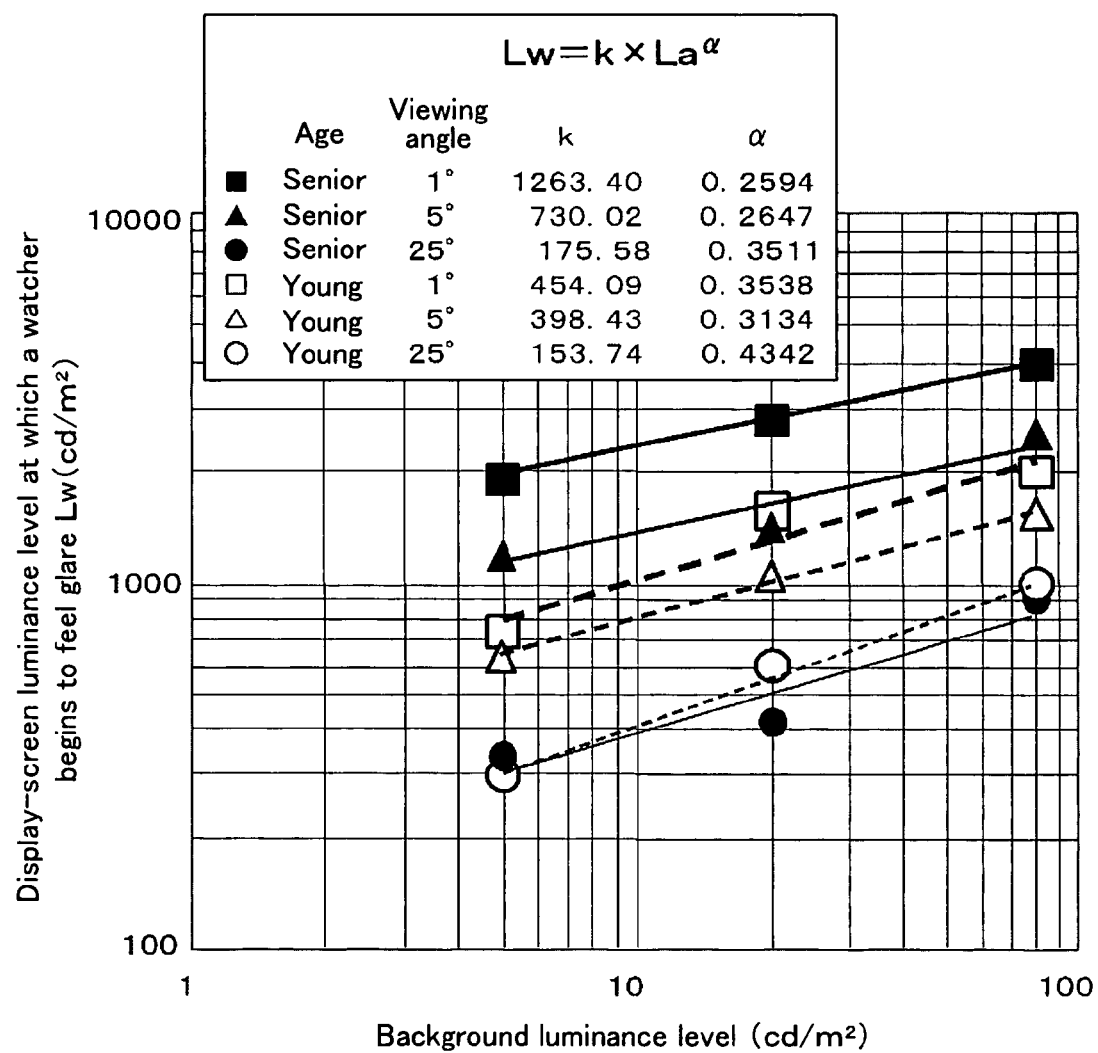
FIG. 3 is a view representing relationships among the sizes of display patterns, viewing distances, and viewing angles.
Figure 4:
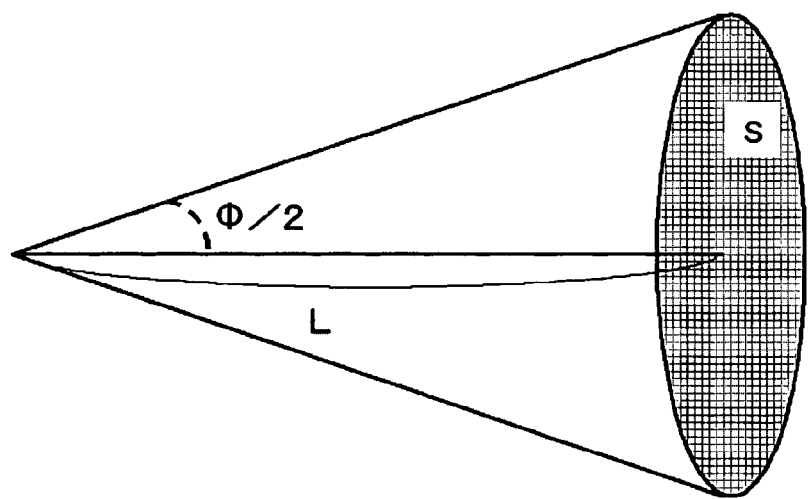
FIG. 4 is an explanatory view of brightness related to the field of view and glare.

FIG. 3 is a result of relationships, obtained by an explanation, between the background luminance La to be a fundamental concept of functions set in the brightness-feeling luminance calculator 6 and a display-screen luminance Lw at which a watcher begins to feel glare. As the explanation, circular patterns, whose sizes are different from each other, on the display screen 10 (viewing angle of 1 degree, 5 degrees, and 25 degrees) are presented to 20 young people aged from 18 to 24 years and 24 senior people aged from 65 to 80 years, under each light environment where the background luminance La is 5, 20, or 80 cd/m², thus, subjective assessment was performed in response to the glare feeling. Here, the subjective assessment was defined to be an item related to the glare feeling, and four-step assessment was performed.

Here, the viewing angle φ of the circular pattern can be obtained by the following equation using the viewing distance L that is the distance between the display screen 10 and the watcher and the area S of the circular pattern.

$$\phi = 2 \times \mathrm{Tan}^{-1}((\sqrt{S/\pi})/L) \qquad (2)$$

In the experiment, the viewing distance was fixed to 1 m. Thus, at each viewing angle under each light environment, the luminance Lw at which each watcher begins to feel glare was obtained by gradually increasing the luminance of the circular pattern on the display screen 10. Each luminance value at which each watcher begins to feel glare was set to Lw, and each average values for the 20 young people and 24 senior people were plotted in FIG. 3. Equation (3) as a relationship between the background luminance La at each viewing angle and the display-screen luminance Lw having been obtained by the assessment of the glare-feeling beginning was obtained from this experimental result.

$$Lw = k \times La^\alpha \qquad (3)$$

Here, α is the visual constant, and k is the luminance control constant. The visual constant α is a constant related to the age and the viewing angle φ. Moreover, the luminance control constant k is a constant mainly related to the viewing angle φ, that is, related to the display size and the viewing distance L.

Next, an operation according to the present invention is described.

The screen-illuminance measurement unit 1 is placed towards the watcher. The screen-illuminance measurement unit 1 measures the illuminance dose to the center of the display screen 10 (screen illuminance) during the display screen 10 being switched off, and outputs the measurement result into the background-luminance calculator 3. Here, if the screen-illuminance measurement unit is difficult to be placed dose to the center of the display screen 10, by placing the screen-illuminance measurement unit dose to the display screen 10, an illuminance measured at that point may also be approximated as the screen illuminance.

By a remote control operation, etc., the set-condition input unit 2 receives information including the age and the visual acuity of the watcher, the background-luminance calculation constant Re used for the background luminance calculation, and the viewing distance. The set-condition input unit 2 outputs the received information into the memory 4. Here, if the information such as the age is not inputted by the remote control operation, etc., a default value predetermined may be used. Moreover, by obtaining the viewing distance and the age by image processing using the watcher's image taken by an imaging device provided on the imaging unit 13, the result obtained may be outputted into the set-condition input unit 2.

A screen illuminance Ei outputted from the screen-illuminance measurement unit 1, and the background-luminance calculation constant Re outputted from the memory 4 are inputted into the background-luminance calculator 3. The background-luminance calculator 3 calculates the background luminance La based on Equation (1), and outputs the result into the memory 4. This background luminance La is then outputted from the memory 4 to the brightness-feeling luminance calculator 6.

The viewing distance stored in the memory 4 is inputted into the viewing-angle-constant calculator 13. Moreover, in the video-signal analyzer 12, the video signals are analyzed, and the effective area of the video patterns displayed on the display screen 10 is calculated. The calculation result is outputted to the viewing-angle-constant calculator 13. The viewing-angle-constant calculator 13 finds the viewing angle $\phi$ based on Equation (2) according to the information. The viewing angle $\phi$ is recorded in the memory 4. Here, as the effective area of the video pattern, the area of the display screen may be simply used, or an area obtained by multiplying the area of the display screen and a constant smaller than 1 may also be used. According to this operation, the video-signal analyzer 12 can be omitted.

The viewing angle $\phi$ recorded in the memory 4 is outputted to the luminance-control constant calculator 5. In the luminance-control constant calculator 5, the luminance-control constant k is obtained using the inputted viewing angle $\phi$. When the luminance-control constant k is obtained, a table that gives the luminance-control constant k from the viewing angle $\phi$ may be used, or the luminance-control constant k may also be obtained by calculating an appropriate function that can be obtained from the experimental result represented in FIG. 3. The obtained luminance-control constant k is recorded in the memory 4. Here, the luminance-control constant k is mainly determined by the viewing angle $\phi$. However, the luminance-control constant k also depends on the age. Therefore, it is also effective that the luminance-control constant calculator 5 receives the age information from the memory 4, and thus, the luminance-control constant k is more accurately obtained using the age as well as the viewing angle $\phi$.

The age and the viewing angle $\phi$ stored in the memory 4 are inputted into the visual-constant calculator 11. The visual-constant calculator 11 includes a table for selecting from the above information a corresponding visual constant $\alpha$ (which can be obtained from the experimental result represented in FIG. 3). The visual-constant calculator 11 selects a visual constant $\alpha$ suited to the watcher's visual condition. The selected visual constant $\alpha$ is recorded in the memory 4. Here, if necessary, the watcher's visual acuity stored in the memory 4 is inputted, and using this in addition to the watcher's age and viewing angle $\phi$, the visual constant $\alpha$ may be determined. By this manner, a further suitable visual constant $\alpha$ can be determined.

The background luminance La, the luminance control constant k, and the visual constant $\alpha$ are outputted from the memory 4 to the brightness-feeling luminance calculator 6. The brightness-feeling luminance calculator 6 calculates, based on Equation (3) using the information, the luminance Lw at which the watcher begins to feel glare. The luminance Lw calculated is outputted to the screen-luminance controller 7.

The screen-luminance controller 7 determines, based on a video-signal luminance distribution, etc. obtained by the video-signal luminance calculator 9, and Lw obtained by the brightness-feeling luminance calculator 6, the maximum luminance value of the video signals so as to be displayed at a brightness level that the watcher does not feel glare. Then, the screen-luminance controller 7 outputs to the display-panel driver 8 signals for controlling the brightness of the display screen 10. The display-panel driver 8 controls the luminance of the display screen based on these signals.

Based on the values of the set conditions such as the age, the viewing distance, the display size, and the background luminance, by installing into an image display device a system that can obtain a brightness level suited to the watcher's visual characteristics, the images can be displayed with a suited brightness level for every age watcher in various brightness environment. Also, in a case in which the watcher watches the screen for a relatively long time, the tiredness of the watcher can be reduced. Moreover, by controlling the brightness of the screen, the reduction of the electric-power consumption can also be achieved.

Moreover, it is found, from the experimental result represented in FIG. 2, to be suitable that the luminance at which the watcher begins to feel glare is calculated by applying the value of the visual constant of $\alpha$=0.31–0.43 to young people, and that of $\alpha$=0.26–0.35 to senior people. Generally, by using each intermediate value thereof, the simplification of the calculation and the reduction of the memory requirements become possible.

By fixing the visual constant $\alpha$, the calculation of the visual-constant calculator 11 can be simplified, and the visual-constant calculator 11 can also be omitted.

Embodiment 2

Figure 5:
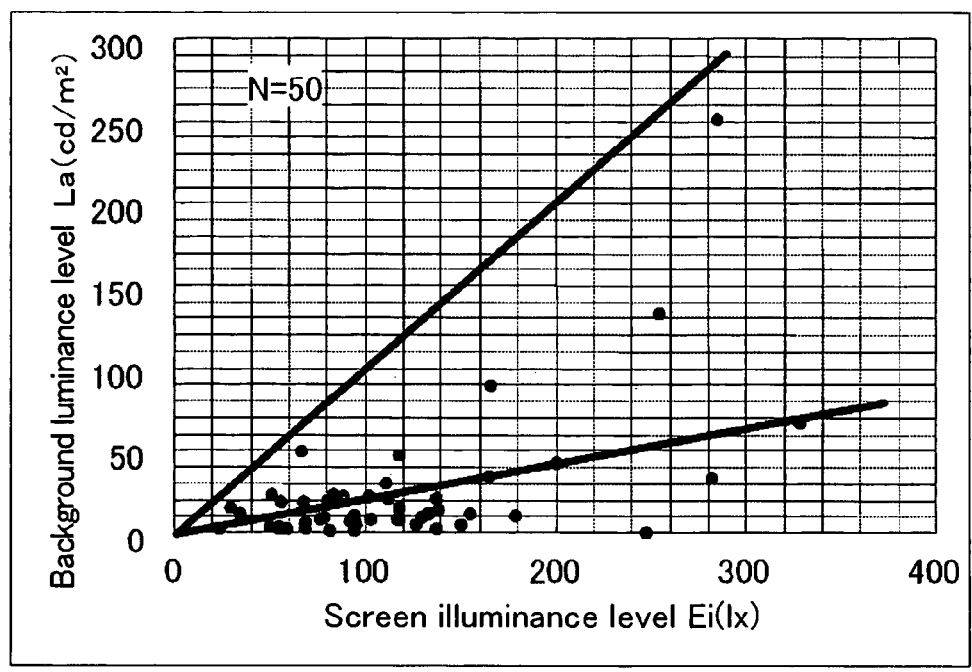
FIG. 5 is a graph representing relationships between screen illuminance of a television set and background luminance according to Embodiment 2 of the present invention.

FIG. 5 is a plot of results that the screen illuminance Ei and the background luminance La are measured in each room, where a television set is placed, of 50 general homes. Straight lines are drawn in FIG. 5 when the factors Re in Equation (1) are "1.0" and "0.2". In general home environment, by setting the background-luminance factor Re to a value not larger than 1.0, the entire home environment can be reflected. Moreover, in general environment, it can also be found to be suitable when using 0.2 as the factor.

By fixing the background-luminance factor Re, calculation using the background-luminance calculator 3 can be simplified, or the background-luminance calculator 3 can also be omitted.

What is claimed is:

1. An image display device comprising:
   a display screen;
   a screen-illuminance measurement unit for measuring the illuminance level close to the display screen;
   a setting unit for setting watcher information including information representing an age of the watcher;
   a calculator for determining the maximum luminance level based on the illuminance level close to the display screen and the information representing an age of the watcher; and
   a screen luminance controller for controlling a luminance level of the display screen in accordance with the maximum luminance level.

2. An image display device as recited in claim 1, wherein the screen-illuminance measurement unit measures the illuminance level towards the watcher in the state of the display screen being switched off.

3. An image display device as recited in claim 1, wherein the watcher information includes the visual acuity of the watcher.

4. An image display device as recited in claim 1, wherein the calculator determines the maximum luminance level based on the illuminance level close to the display screen, the watcher information, and a distance between the display screen and the watcher.

5. An image display device as recited in claim 1, further comprising an imaging unit for determining an age of the watcher, the imaging unit comprising an image sensor which captures an image of the watcher and an image processing unit which determines the age of the watcher by applying image processing to the captured image.

6. An image display device as recited in claim 1, further comprising a detecting unit for detecting a distance between the display screen and the watcher,
  wherein the calculator determines the maximum luminance level based on the illuminance level close to the display screen, the watcher information, and the detected distance.

7. An image display device as recited in claim 4, wherein the calculator calculates an average background luminance level of the image display device based on the illuminance level close to the display screen, and determines the maximum luminance level based on the average background luminance level, the watcher information, and the distance between the display screen and the watcher.

8. An image display device as recited in claim 4, wherein the calculator calculates, based on the viewing distance and an effective area of the display screen, an effective viewing angle of the display screen seen from the watcher, and creates the information based on the viewing angle, the illuminance level close to the display screen, and the watcher information.

9. An image display device as recited in claim 7, wherein the average background luminance level of the image display device is proportional to the illuminance level close to the display screen.

10. An image display device as recited in claim 9, wherein the average background luminance level of the image display device is proportional to the illuminance level close to the display screen, and its proportionality factor is not larger than 1.

11. An image display device as recited in claim 1, wherein the maximum luminance level is a luminance level smaller than that at which the watcher begins to feel glare.

12. An image display device as recited in claim 1, further comprising a display-panel driver for driving a display panel constituting the display screen, the display-panel driver driving the display panel so that a luminance level of the display panel does not exceed the maximum luminance level determined by the calculator.

13. An image display device as recited in claim 1, wherein the information representing an age of the watcher indicates whether the watcher is senior or young.

14. A method implemented in an image display device, the method comprising:
  utilizing a light receiving element to measure an illuminance level close to a display screen of the display device;
  setting watcher information including information representing an age of the watcher;
  determining a maximum luminance level of the display screen based on the illuminance level close to the display screen and the information representing an age of the watcher; and
  controlling a luminance level of the display screen in accordance with the maximum luminance level.

15. The method as recited in claim 14, wherein the illuminance level is measured in a state of the display being switched off.

16. The method as recited in claim 14, wherein the maximum luminance level is determined based on a distance between the display screen and the watcher in addition to the illuminance level close to the display screen and the watcher information.

17. The method as recited in claim 14, wherein the information representing an age of the watcher indicates whether the watcher is senior or young.

* * * * *